(12) United States Patent
Zakowski et al.

(10) Patent No.: US 10,433,675 B2
(45) Date of Patent: Oct. 8, 2019

(54) ADJUSTABLE SLICING MECHANISM FOR A FOOD PROCESSOR

(71) Applicants: Joseph W. Zakowski, Avon, CT (US);
Bryan Hotaling, Harvard, MA (US);
Matthew Naples, Acton, MA (US);
John MacNeill, Acton, MA (US)

(72) Inventors: Joseph W. Zakowski, Avon, CT (US);
Bryan Hotaling, Harvard, MA (US);
Matthew Naples, Acton, MA (US);
John MacNeill, Acton, MA (US)

(73) Assignee: Conair Corporation, Stamford, CT (US)

( * ) Notice: Subject to any disclaimer, the term of this patent is extended or adjusted under 35 U.S.C. 154(b) by 728 days.

(21) Appl. No.: 15/013,394

(22) Filed: Feb. 2, 2016

(65) Prior Publication Data

US 2017/0217042 A1    Aug. 3, 2017

(51) Int. Cl.
*A47J 43/07*   (2006.01)
*B26D 7/26*    (2006.01)
*B26D 1/29*    (2006.01)

(52) U.S. Cl.
CPC ....... *A47J 43/0716* (2013.01); *A47J 43/0722* (2013.01); *B26D 1/29* (2013.01); *B26D 7/2628* (2013.01)

(58) Field of Classification Search
CPC .. A47J 43/0722; A47J 43/0716; B26D 7/2628
USPC .................................................. 241/92, 286
See application file for complete search history.

(56) References Cited

U.S. PATENT DOCUMENTS

| 2,575,770 | A | 10/1950 | Roop |
| 3,013,692 | A | 1/1959 | Chesley |
| 3,642,168 | A | 2/1972 | Wiley, Jr. et al. |
| 4,586,666 | A | 5/1986 | Fox |
| 5,018,675 | A | 5/1991 | Gateaud |
| 6,971,597 | B2 | 12/2005 | Starr |
| 7,159,808 | B2 | 1/2007 | Starr |
| 7,328,864 | B2 * | 2/2008 | Narai ............... A47J 43/255 241/273.2 |
| 8,448,788 | B2 | 5/2013 | Krasznai et al. |
| 8,584,979 | B2 | 11/2013 | Allen |
| 2014/0014752 | A1 * | 1/2014 | Beber ............... A47J 43/046 241/100 |
| 2014/0042255 | A1 | 2/2014 | Allen |

* cited by examiner

*Primary Examiner* — Elaine Gort
*Assistant Examiner* — Christopher B Wehrly
(74) *Attorney, Agent, or Firm* — Grogan, Tuccillo & Vanderleeden, LLP

(57) ABSTRACT

A food processor includes a base, a motor disposed within the base, a drive shaft operatively connected to the motor and extending outwardly from the base, the output shaft being rotatable upon actuation of the motor, a bowl removably coupled to the base, a lid removably coupled to the bowl so as to define a processing chamber, a slicing assembly positioned within the processing chamber and driven by the motor, the slicing assembly being positionable in a plurality of slicing positions to produce sliced food items of varying thicknesses, and a slice thickness adjustment mechanism operable to move the slicing assembly between the plurality of slicing positions. The slice thickness adjustment mechanism includes a cartridge mounted to the bowl, the cartridge including an actuator drivingly coupled to a drive screw. Rotation of the drive screw causes the slicing assembly to move between the plurality of slicing positions.

12 Claims, 14 Drawing Sheets

ADJUSTABLE SLICING MECHANISM FOR A FOOD PROCESSOR

FIELD OF THE INVENTION

The present invention relates to food processors and, more particularly, to an adjustable slicing mechanism for a food processor.

BACKGROUND OF THE INVENTION

Food processing devices providing a number of different types of food preparations, such as mixing, grinding, chopping, slicing, grating, shredding, or other processing operations, are well known. Existing food processing devices typically include a base housing an electric motor, a drive shaft driven by the motor, a bowl receivable on the base and a lid or cover having a feed tube releasably mounted to the bowl. A rotatably driven blade is mounted to the drive shaft to process one or more food items inside the bowl.

While existing food processing devices are generally suitable for what is regarded as ordinary performance, there is room for improvement in terms of ease of use, expanded functionality and modularity. In particular, a limitation of existing food processing devices is that when utilized with a slicing disc, they must be turned off and the blade assembly removed in order for a user to manually adjust the slicing thickness on the blade. Accordingly, it is desirable to provide an adjustable slicing mechanism that is quickly and easily configurable to enable a user to selectively slice food items into a variety of desired thicknesses.

SUMMARY OF THE INVENTION

It is an object of the present invention to provide a food processor.

It is an object of the present invention to provide a food processor having a mechanism for adjusting the slice thickness of a food item.

It is another object of the present invention to provide a food processor having a mechanism for externally adjusting the slice thickness of a food item.

These and other objects are achieved by the present invention.

According to an embodiment of the present invention, a food processor is provided. The food processor includes a base, a motor disposed within the base, a drive shaft operatively connected to the motor and extending outwardly from the base, the output shaft being rotatable upon actuation of the motor, a bowl removably coupled to the base, a lid removably coupled to the bowl so as to define a processing chamber, a slicing assembly positioned within the processing chamber and driven by the motor, the slicing assembly being positionable in a plurality of slicing positions to produce sliced food items of varying thicknesses, and a slice thickness adjustment mechanism operable to move the slicing assembly between the plurality of slicing positions. The slice thickness adjustment mechanism includes a cartridge mounted to the bowl, the cartridge including an actuator drivingly coupled to a drive screw. Rotation of the drive screw causes the slicing assembly to move between the plurality of slicing positions.

According to another embodiment, a bowl for a food processor is provided. The bowl includes a floor, a plurality of sidewalls extending from the floor and defining a processing chamber, a handle, and a slice thickness adjustment cartridge mounted below the floor. The slice thickness adjustment cartridge includes a rotatable dial beneath the handle and drivingly coupled to a drive screw. Rotation of the dial causes the drive screw to selectively extend from and retract into the cartridge to move a slicing assembly between a plurality of slicing positions.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
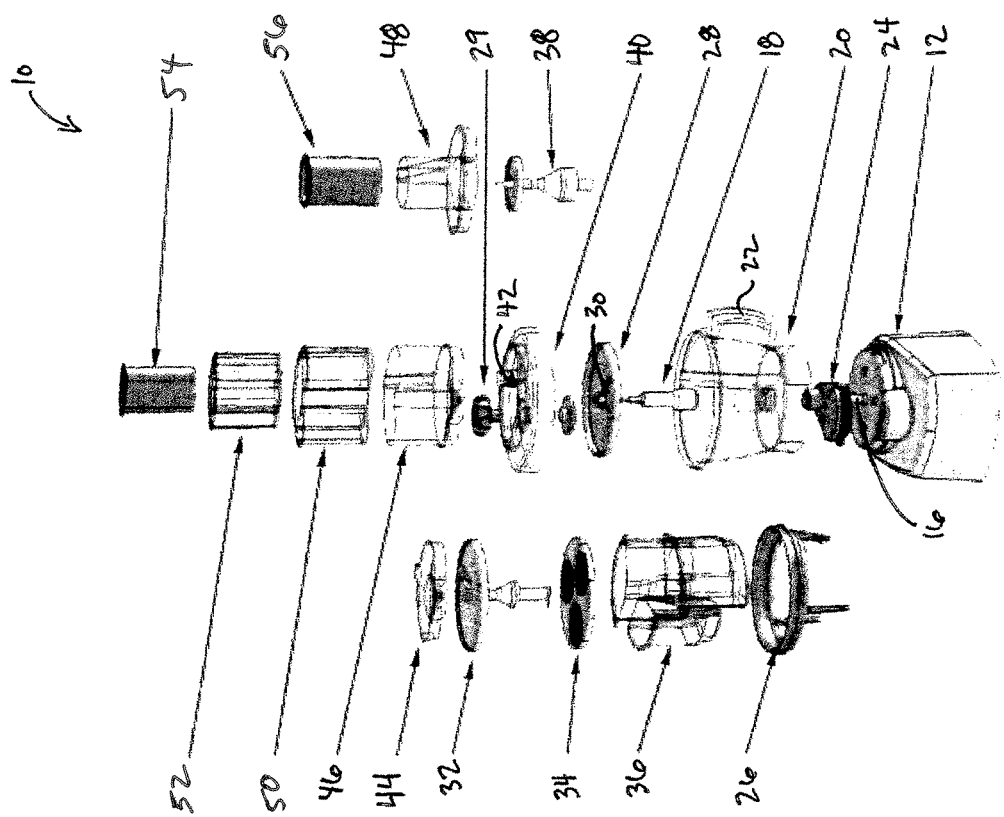
FIG. 1 is an exploded view of a food processor according to an embodiment of the present invention.

Referring to FIG. 1, a food processor 10 according to the present invention is shown. The food processor 10 includes base housing 12 having a motor (not shown) disposed within. The motor is preferably a conventional electric motor that is reversible and has a variable speed between approximately 500-3,500 RPM. The motor is operatively engaged with a drive shaft 16 to cause the drive shaft 16 to rotate. The motor is oriented such that the drive shaft 16 extends upwardly from the motor, extending outwardly and/or protruding from a top surface of the base housing 12. The base housing 12 may include a user interface electrically connected to the motor to enable a user to control the speed of the motor. As is known in the art, the user interface may include one or more knobs, dials, buttons, toggle switches or the like. A terminal end of the drive shaft 16 extends outwardly from the base housing and has a plastic adapter shaft 18 engageable and rotatable therewith. A distal end of the adapter shaft 18 includes a blade coupling configured to engage a cutting blade or other attachment, as discussed hereinafter.

Figure 2:
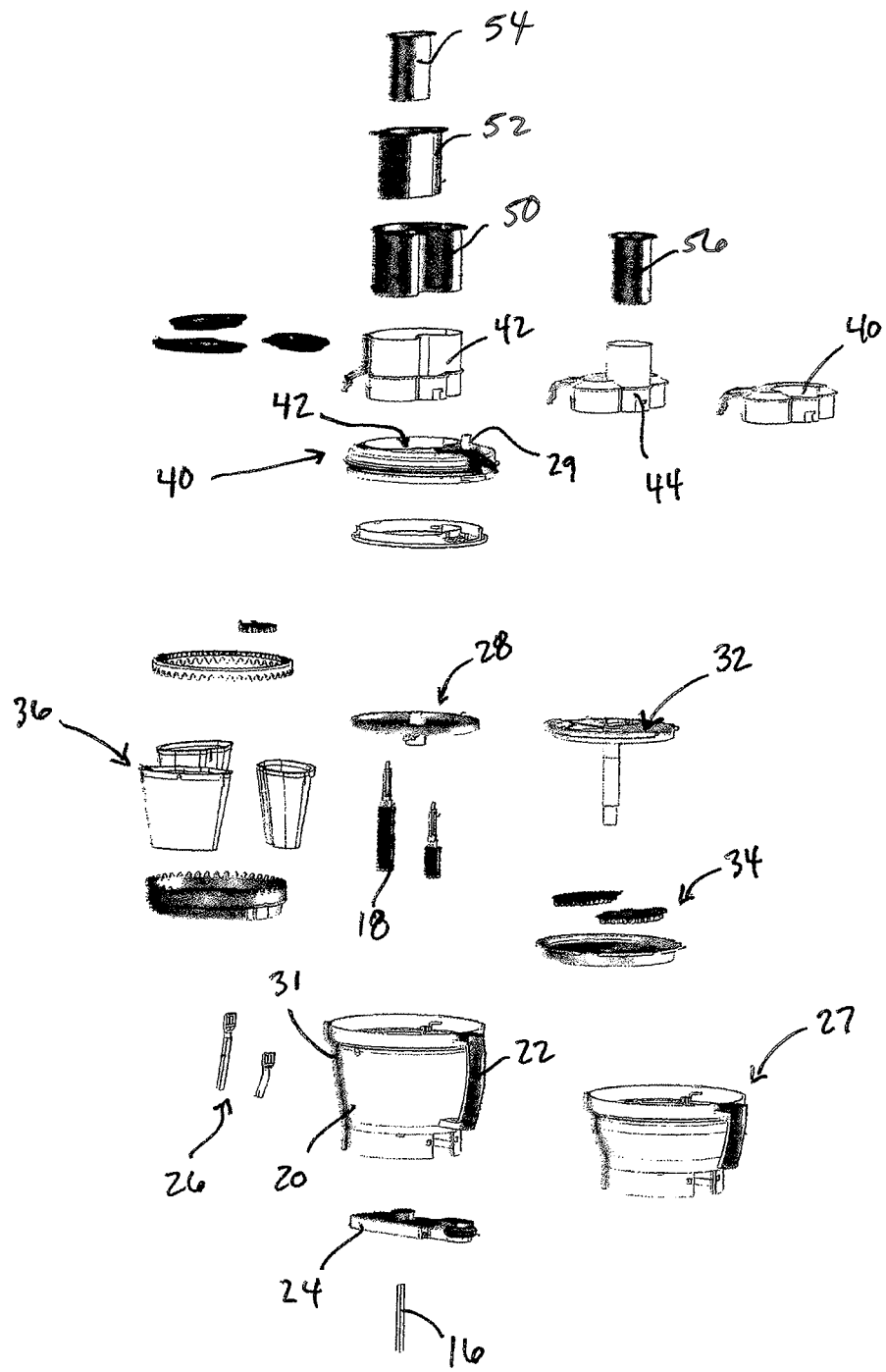
FIG. 2 is an exploded parts view of a food processor according to an embodiment of the present invention.
Figure 3:
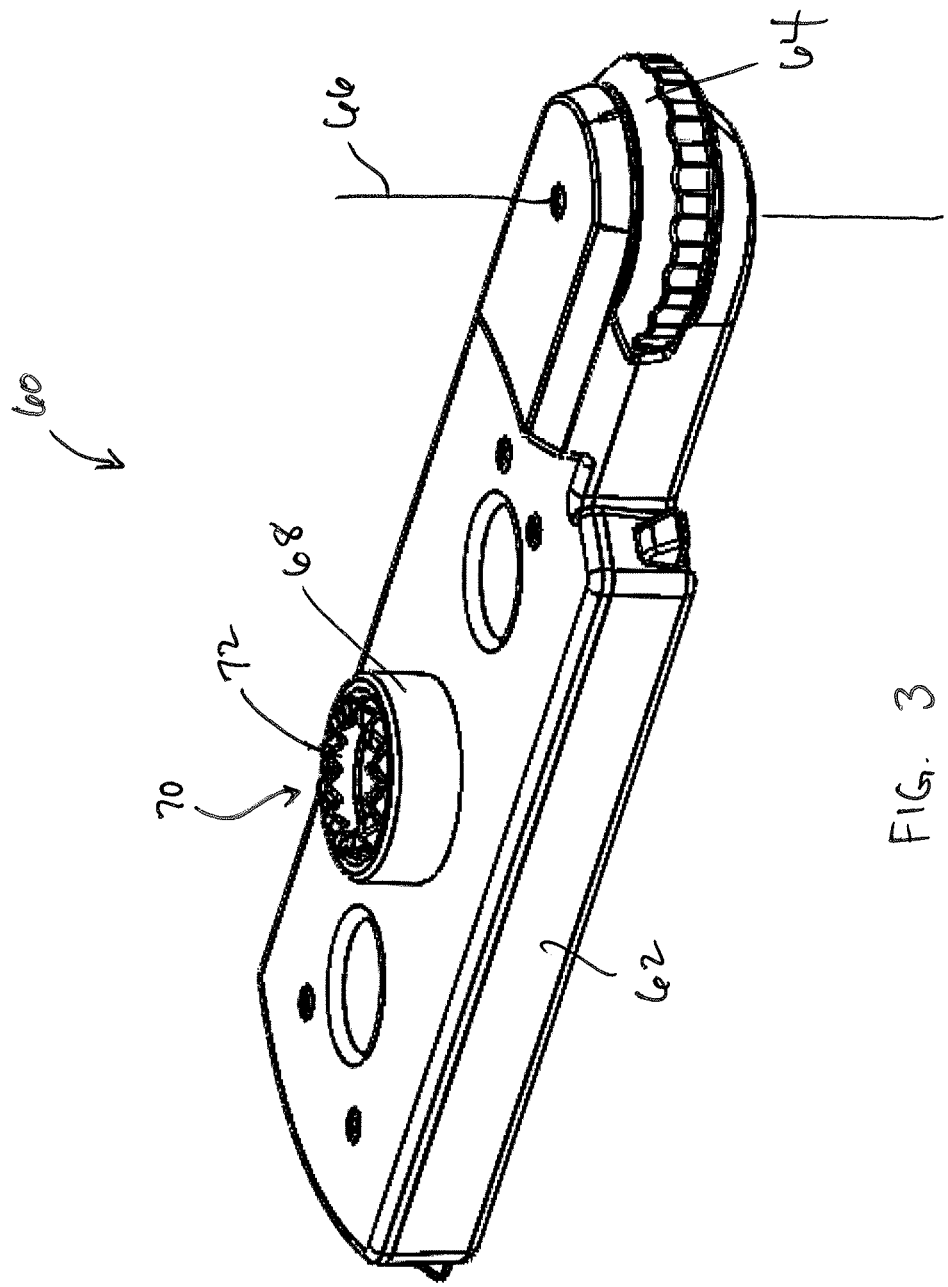
FIG. 3 is a perspective view of a cartridge of a slice thickness adjustment mechanism of the food processor of FIG. 2.
Figure 4:
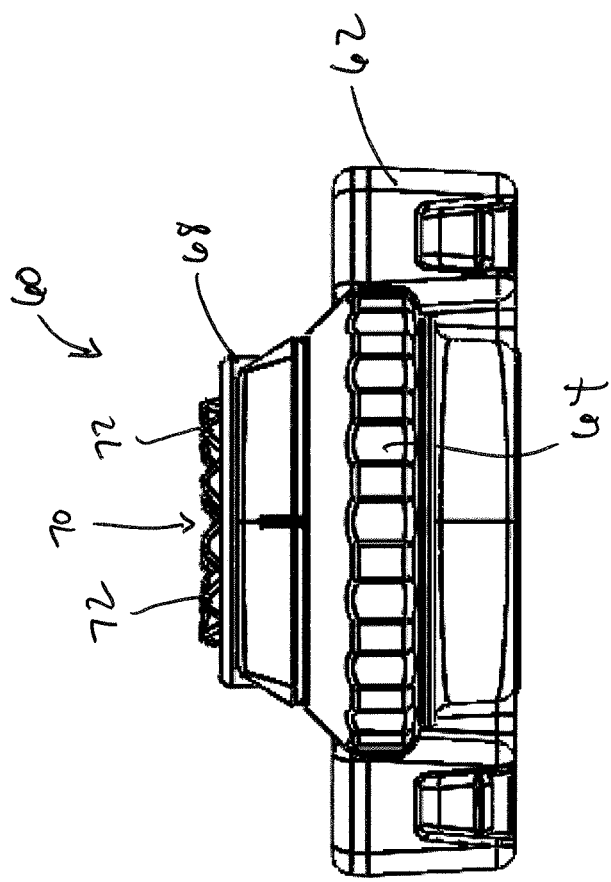
FIG. 4 is an end view of the cartridge of FIG. 3.
Figure 5:
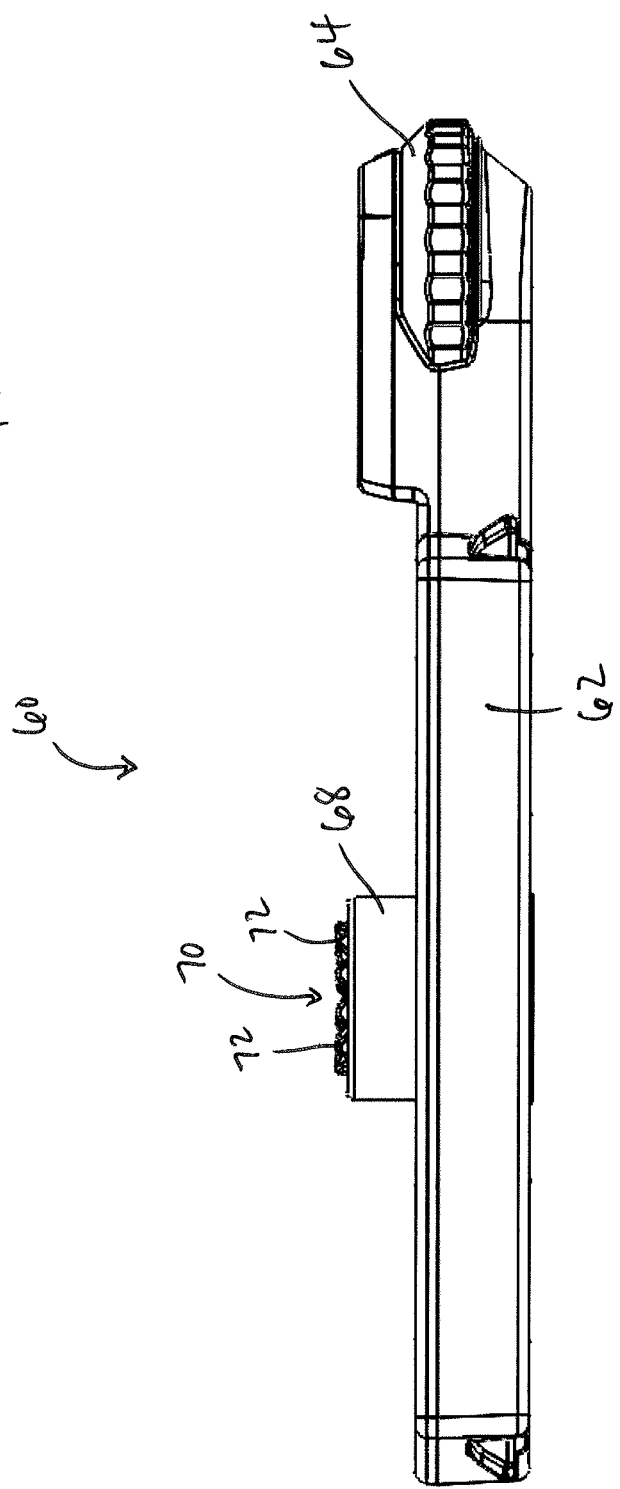
FIG. 5 is a side view of the cartridge of FIG. 3.

Referring to FIGS. 1 and 2, the food processor 10 also includes a bowl 20 removably securable on the base housing 12. Preferably, the bowl 20 has a plurality of protrusions that slidingly engage within corresponding slots in the base housing to retain the bowl 20 on the base housing 12. For example, the bowl 20 may be retained on the base 12 via a bayonet style coupling, as is known in the art, that resists forces in both the clockwise and counterclockwise directions. Extending upwardly from the center of the bottom wall of the bowl 20 is a generally cylindrical central tube sized to accommodate the drive shaft 16 therethrough when the bowl 20 is secured to the base housing 12 in an assembled position. A handle 22 is integrally molded to the sidewall of the bowl and extends outwardly therefrom, to provide the user with a gripping surface with which to pick up, carry, and otherwise handle the bowl 20. In an embodiment, the bowl 20 may also be provided with a slicing disc adjustment mechanism 24 configured to mate with the lower end of the adapter shaft 18 and operable from outside the bowl 20 by a user to vary the slice thickness of food items. In addition, the bowl 20 may be provided with a sidewall cleaning mechanism 26 having a plurality of scraper blades or wipers that contact the inner sidewall of the bowl 20. The sidewall cleaning mechanism 26 includes a knob 29 accessible above the bowl 20 that is selectively rotatable by a user to cause the wipers to rotate about the inner periphery of the bowl 20 to scrape the sides of the bowl 20 during processing of food items, as discussed in detail hereinafter.

As shown in FIG. 2, a smaller capacity bowl 27 may be mounted to the base 12 in lieu of the larger capacity bowl 20, such as when a smaller volume of food is to be processed. In an embodiment, the bowl 20 has a 16-cup capacity and the smaller bowl 27 has a 4-8 cup capacity.

As best shown in FIG. 2, the bowl 20 may also include an optical channel 31 on the periphery thereof. The optical channel 31 is configured to receive an optical signal generated by the control unit within the base 12 to ensure the bowl 20 is properly seated on the base 12, and a lid is properly seated on the bowl 20. For example, when an optical signal sent from the base is reflected and received back at the base by an optical sensor, this indicates that the base, bowl and lid are in proper position for food processing. This "optical interlock" ensures that the motor will not operate, and the processing tool will not rotate, unless the bowl and lid are in proper position.

Although the base housing 12 is shown as being generally square-shaped, it is within the spirit and scope of the present invention that the base housing 12 be of a different shape as long as the base housing 12 can still perform its intended functions, as described herein. Additionally, although the bowl 20 is shown as being removably retained at the top of the base housing 12, it is within the spirit and scope of the present invention that the base housing 12 be generally L-shaped when viewed from the side, such that the motor is disposed within the vertically-oriented portion and the bowl 20 is disposed on top of the horizontally-oriented portion.

As further shown in FIGS. 1 and 2, a cutting tool 28 is rotatably securable to the drive shaft 16. In particular, the cutting tool 28 is rotatably fixed to the adapter shaft 18 proximate the terminal end of the drive shaft 16 and is positioned within the bowl 20 above the top edge of the central tube, when in the assembled position. In an embodiment, the cutting tool 28 is a generally circular metallic disk having at least one slicing blade 30 formed therein as is well understood by those of ordinary skill in the art.

Alternatively, a dicing mechanism including a dicing blade 32 and a dicing plate 34 may be utilized in place of the cutting tool 28 in order to dice food items. In connection with the dicing mechanism, a plurality of indexing storage containers 36 may be inserted into the bowl 20 in nested position with the wiper element 26, below the dicing plate 34. The wiper element 26 may be selectively rotated by a user to index the storage containers 36 to a desired position beneath the dicing plate 34 to collect diced food items therein. In yet another embodiment, a spiral cutting blade assembly 38 may be utilized in place of the cutting tool 28 in order to cut food items into spiral shapes.

The food processor 10 further includes a lid 40 that is removably securable to a top of the bowl 20. The lid 40 defines a substantially circular body sized and dimensioned to cover the bowl 20, and has an opening 42 formed therein configured to receive one of a flat cover 44, a large feed tube 46 or a spiral feed tube 48, as selected by a user, as best shown in FIGS. 1 and 2. The opening 42 in the lid may be generally oval or kidney shaped, although other shapes and dimensions are envisioned. As illustrated in FIGS. 1 and 2, the flat cover 44, large feed tube 46 and spiral feed tube 48 each include a lower portion sized and shaped to be received in the opening 42, and a peripheral flange limiting the insertion depth of the respective flat cover 44, large feed tube 46 or spiral feed tube 48 into the opening 42 and preventing such components from falling into the bowl 20.

As also shown in FIGS. 1 and 2, the large feed tube 46 may include a pusher assembly having a plurality of nestable pushers including a first pusher 50, a second pusher 52 and a third pusher 54. Similarly, the spiral feed tube 48 may include a pusher 56 dimensioned to be slidably received therein. The various pushers may be utilized to urge food items through the lid 40 and into the cutting tool 28 or other food processing implement within the bowl, in a manner heretofore known in the art.

Turning now to FIGS. 3-14, the slicing disc adjustment mechanism 24 (also referred to as slice thickness adjustment mechanism) which is operable to move the rotating disc 28 relative to the cutting blade 30 is illustrated. As shown therein, the slice thickness adjustment mechanism 24 includes, generally, a cartridge 60, the adapter shaft 18 and the cutting disc 28 having slicing blade 30.

Figure 6:
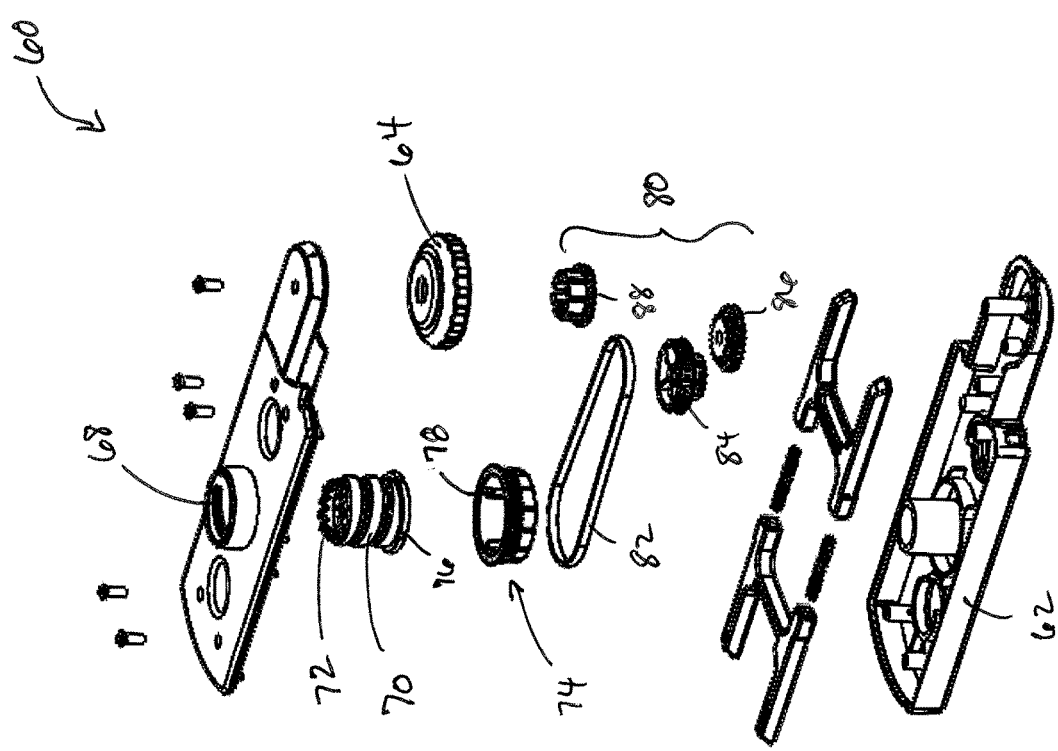
FIG. 6 is an exploded view of the cartridge of FIG. 3.

With reference to FIGS. 3-6, the cartridge 60 is illustrated. The cartridge 60 defines a generally rectangular body or housing 62 having an actuator positioned at one end thereof. As shown in FIGS. 3-6, the actuator is preferably formed as a dial 64 rotatable about a vertical axis 66. Alternatively, the actuator may be formed as a lever. The cartridge 60 further includes an internally threaded sleeve 68 extending upward from the housing 62 and offset laterally from the dial 64. The sleeve 68 is configured to receive a corresponding externally threaded lift screw 70 therein. The lift screw 70 includes a plurality of teeth 72 formed on an upper end thereof that are configured to mate with corresponding teeth formed on a lower end of the adapter shaft 18, as discussed in detail below. The lift screw 70 is also configured to be received in a lower sleeve 74, as shown in FIG. 6. In connection with this, a lower end of the lift screw 70 includes a plurality of radially oriented grooves 76 that are configured to slidably receive corresponding ribs 78 formed on the internal surface of the lower sleeve 74. As will be readily appreciated, therefore, rotation of the lower sleeve 74 imparts a corresponding rotation to the lift screw 70.

As further illustrated in FIG. 6, the lower sleeve 74 is drivingly coupled to the rotatable dial 64 via a gear assembly 80. In an embodiment, the gear assembly 80 may include a drive belt 82 and a plurality of sprockets or intermeshing gears 84, 86, 88. In operation, rotation of the dial 64 about its vertical axis 66, in a clockwise direction, causes a corresponding rotation of the lower sleeve 74 via the gear assembly 80 which, in turn, causes the lift screw 70 to rotate. By way of the threaded engagement of the lift screw 70 within upper sleeve 68, the lift screw 70 translates upward relative to the housing 62 during such rotation. Rotation of the dial 64 in the opposite direction causes the lift screw 70 to retract into the cartridge 60.

Figure 7:
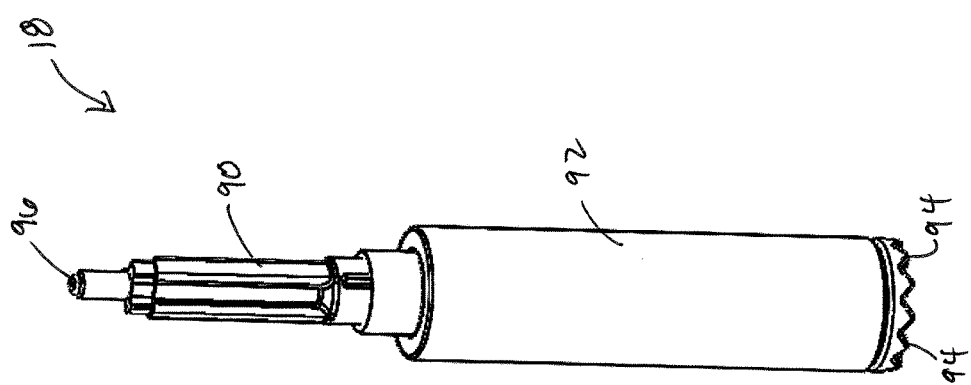
FIG. 7 is a perspective view of an adapter shaft of the slice thickness adjustment mechanism.
Figure 8:
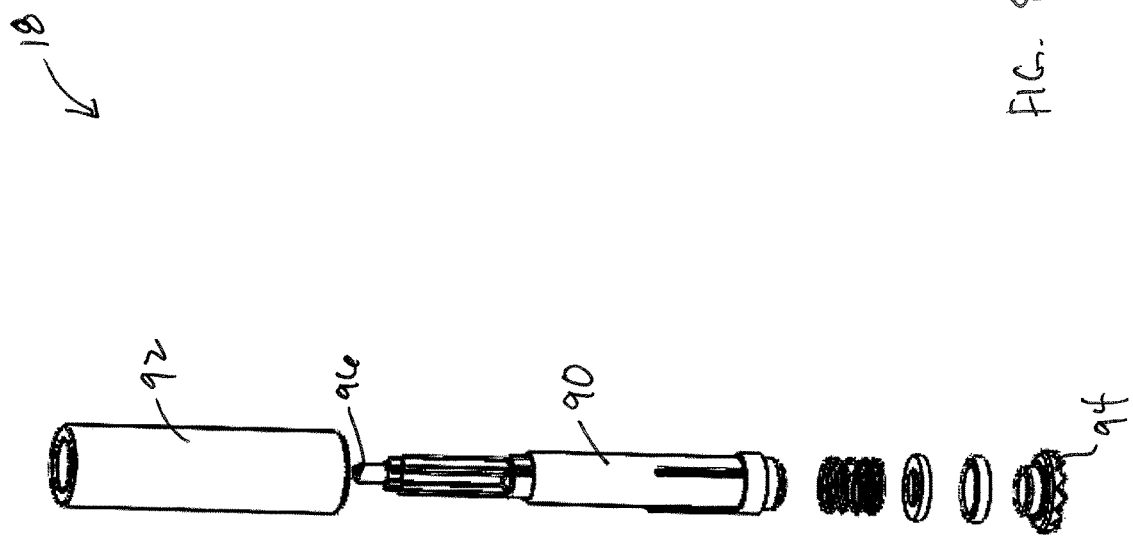
FIG. 8 is an exploded view of the adapter shaft of FIG. 7.

Referring now to FIGS. 7 and 8, the adapter shaft 18 is more clearly illustrated. The adapter shaft 18 includes a drive stem 90 contained within a cylindrical housing 92. A lower end of the housing 92 is formed with a plurality of teeth 94 configured to mate with the teeth 72 of the lift screw 70 such that rotation of the lift screw 70 imparts a corresponding rotation to the housing 92 of the adapter shaft 18. In an embodiment, the teeth 94 may be integrally formed with the housing 92. Alternatively, the teeth 94 may be formed as a separate component that is secured to the housing 92. The adapter shaft 18 also includes an upper end 96 secured to a hub 98 of the rotating disc 28.

Figure 9:
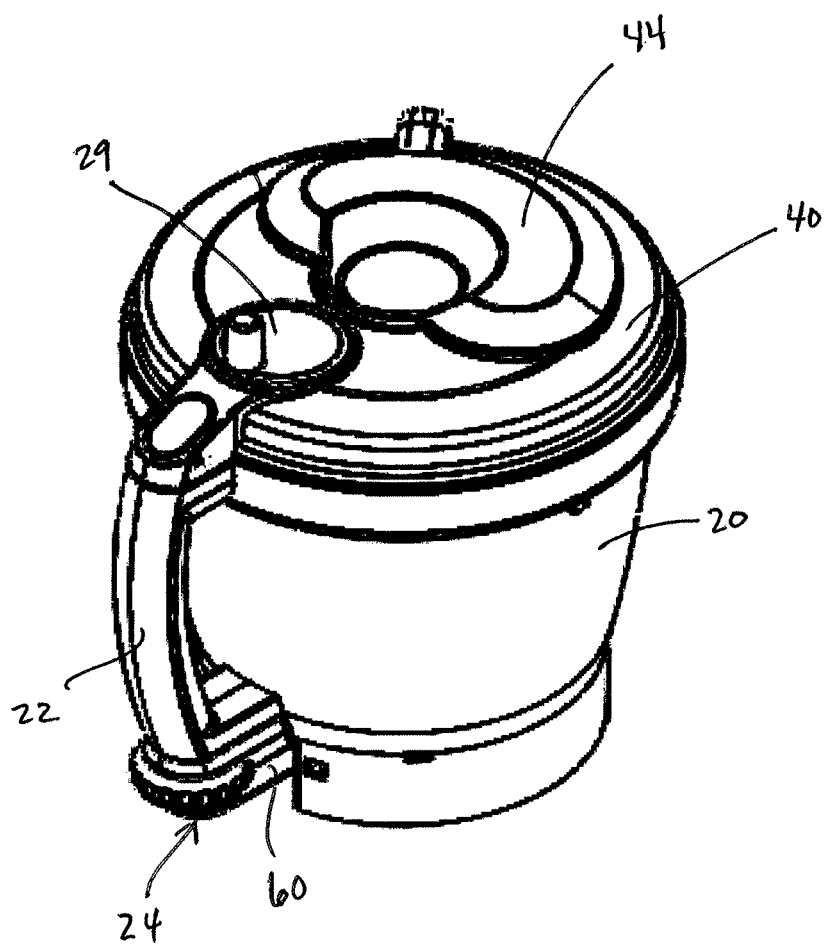
FIG. 9 is a perspective view of a work bowl of the food processor, showing the position of the slice thickness adjustment mechanism.
Figure 10:
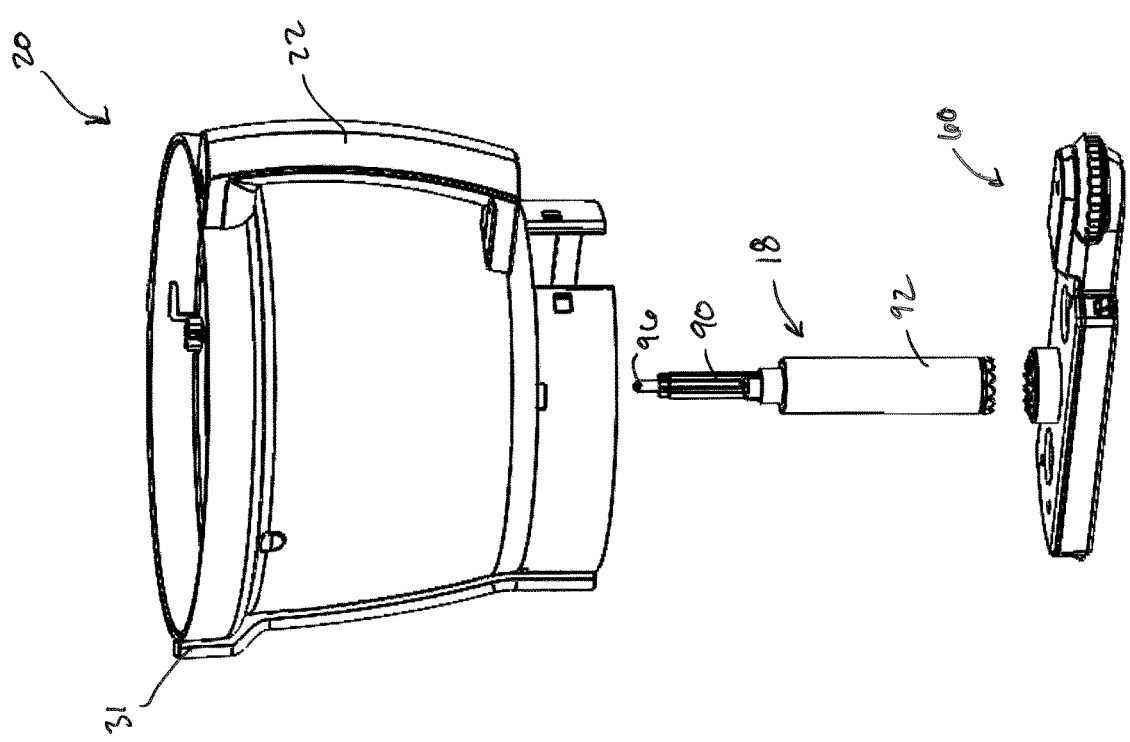
FIG. 10 is a partially exploded, perspective view of the slice thickness adjustment mechanism of the food processor of FIG. 1, according to an embodiment of the present invention.
Figure 11:
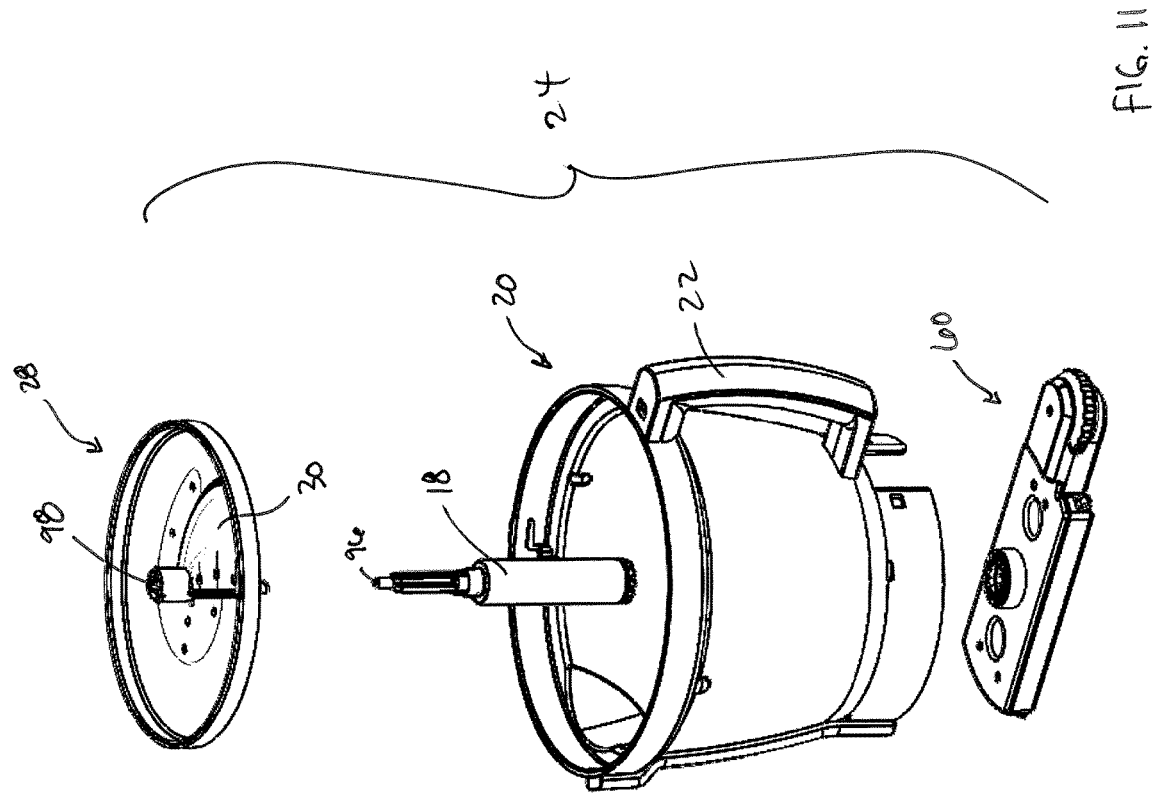
FIG. 11 is another partially exploded, perspective view of the slice thickness adjustment mechanism.
Figure 12:
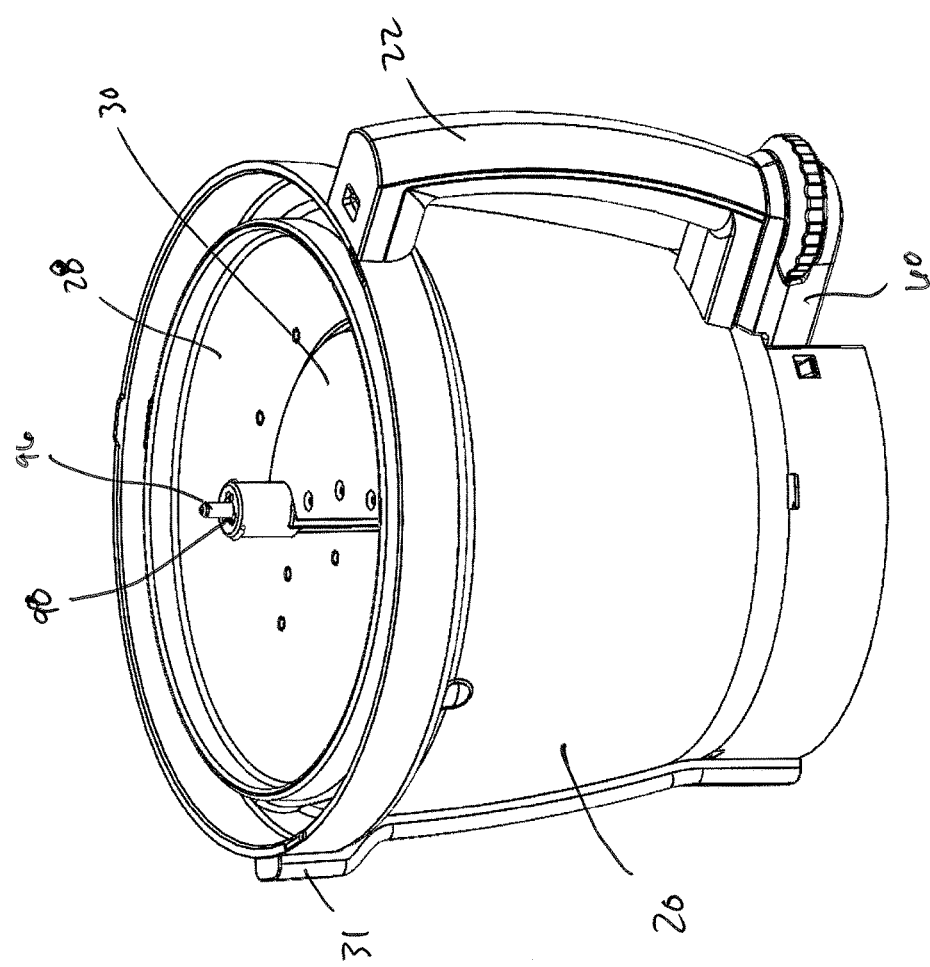
FIG. 12 is another perspective view of the slice thickness adjustment mechanism, shown in an assembled position.

As illustrated in FIGS. 9-12, the slice thickness adjustment mechanism 24 is shown in connection with the work bowl 20. As best shown in FIG. 9, the cartridge 60 is mounted to the underside of the work bowl 20 such that the dial 64 is located directly below the handle 22. As illustrated, the work bowl 20, lift screw 70 and the adapter shaft 18 are substantially concentric with a drive axis of the motor, and are offset laterally from dial axis 66.

Figure 13:
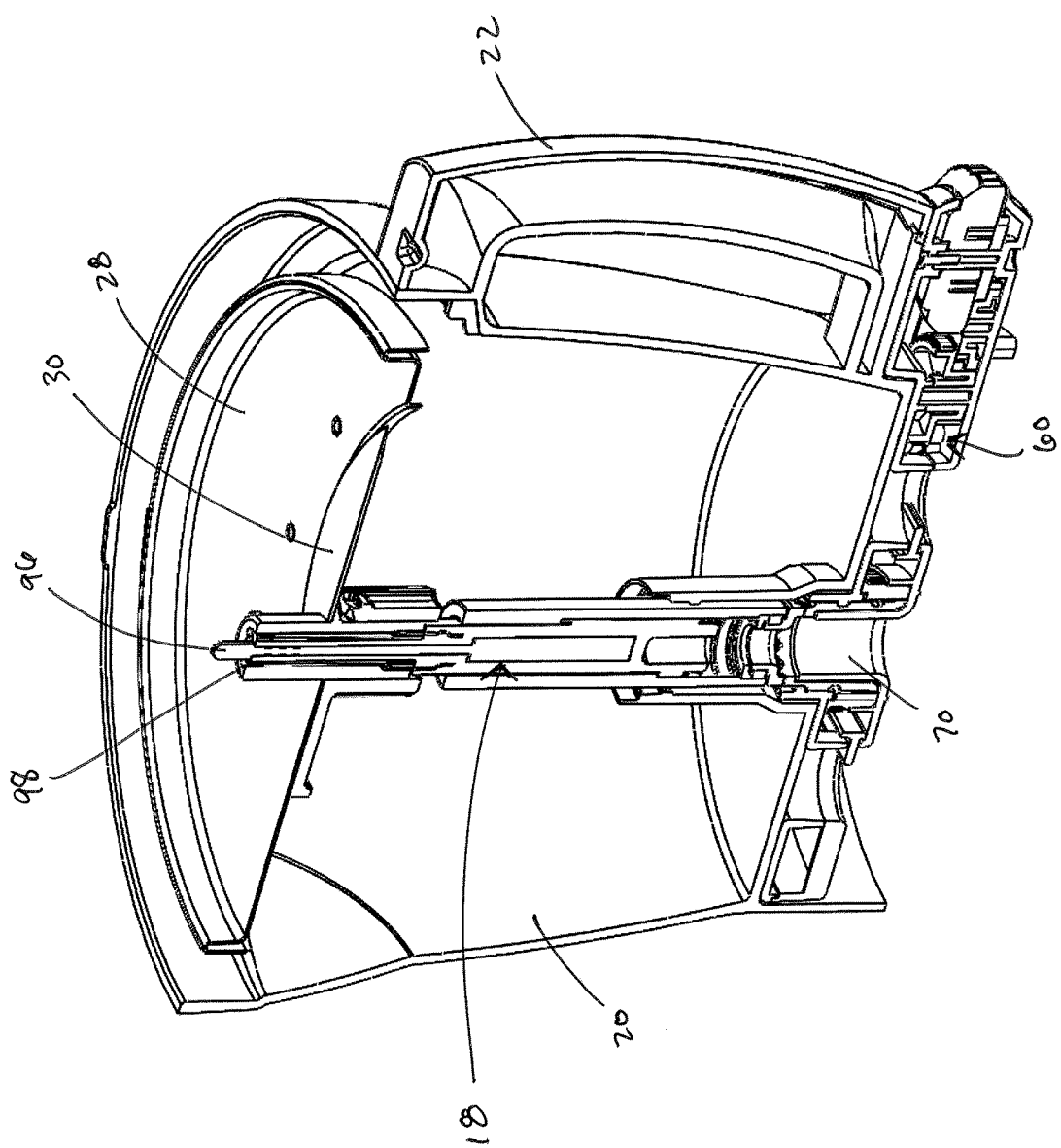
FIGS. 13 and 14 are cross-sectional views of the adjustable slicing mechanism.
Figure 14:
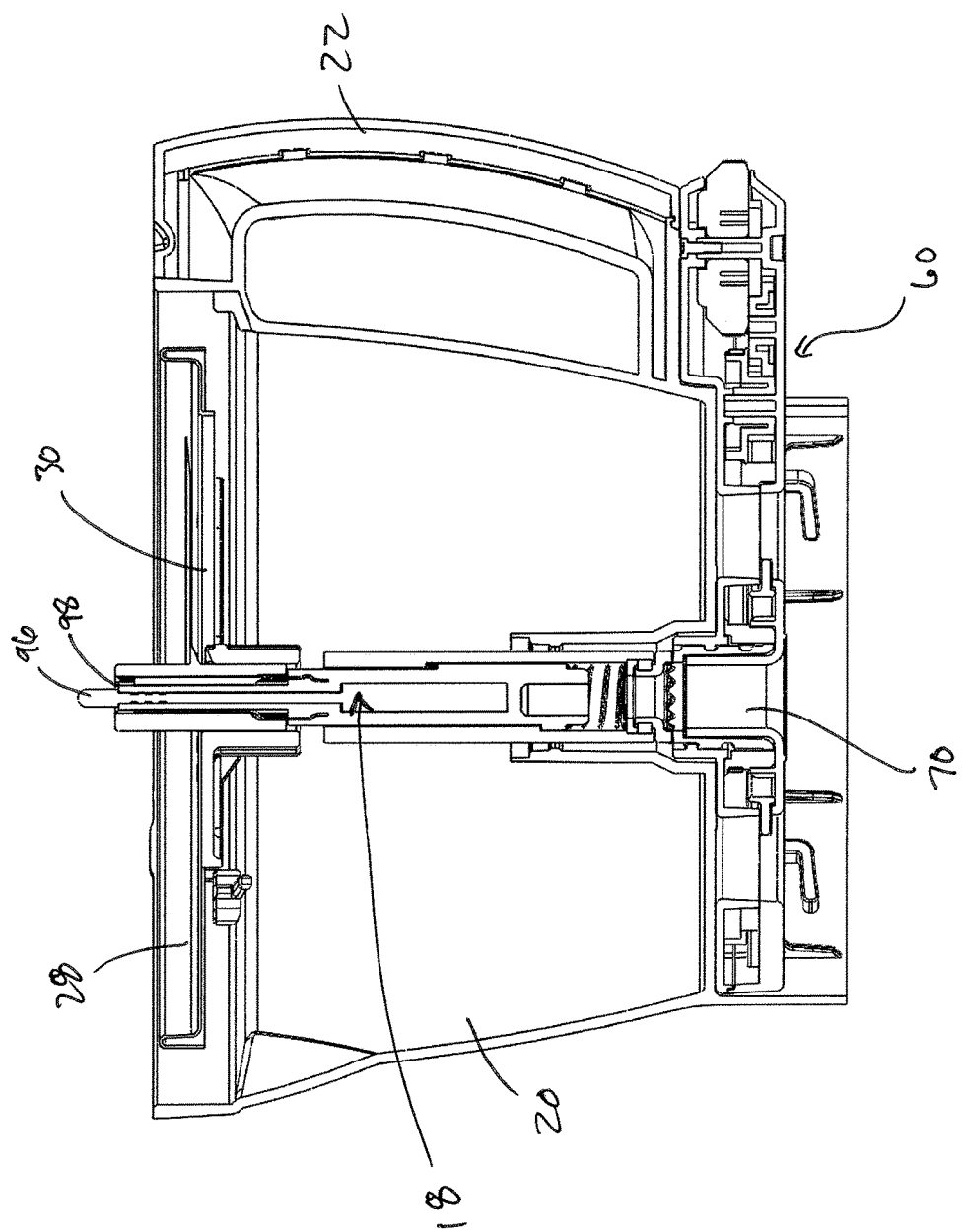

With reference to FIGS. 13 and 14, in operation, the thickness of food items being processed can be varied by rotating dial 64. In particular, rotation of the dial 64 by a user causes the lower sleeve 74 within the cartridge 60 to rotate via the gear assembly 80, as discussed above. Rotation of the lower sleeve 74 causes the drive screw 70 to also rotate, and to advance linearly upward or downward (depending on the direction of rotation of the dial 64) relative to the cartridge 60 within the upper sleeve 68. Due to the engagement of the teeth 72 of the drive screw 70 with the teeth 94 on the lower end of the adapter shaft 18, the housing 92 of the adapter shaft 18 is correspondingly rotated and driven upwardly. That is, as the drive screw 70 advances upward, the housing 92 of the adapter shaft 18 is also caused to advance upward. Because the upper end 96 is secured to the hub 98 of the rotating disc 28, the vertical movement of the adapter shaft 18 causes vertical movement of the rotating disc 28 relative to the cutting blade 30. As such, when the adapter shaft 18 is moved downwardly, the rotating disc 28 is moved downwardly, and the distance between the cutting edge of the cutting blade 30 and the upper surface of the rotating disc 28 is increased, thereby producing thicker slices of food. Conversely, as the adapter shaft is moved upwardly, the rotating disc 28 is moved upwardly, and the distance between the cutting edge of the cutting blade 30 and the upper surface of the rotating disc is decreased, thereby producing thinner slices of food.

In the preferred embodiment, the dial 64 may include a plurality of markings corresponding to a variety of selectable slice thicknesses. Preferably, the slice thickness adjustment mechanism is operable to provide a maximum slice thickness of approximately 10 mm, although the components may be altered to provide for greater or less separation distance between the blade 30 and disc body 28 to provide for an even greater range of slice thicknesses, without departing from the broader aspects of the present invention.

The present invention therefore provides a food processing device and slice thickness adjustment mechanism therefor that permits a user to quickly and easily vary the thickness of processed food items. Importantly, the slice thickness adjustment mechanism 24 is integrated with the work bowl 20, enabling the slice thickness adjustment mechanism to be utilized with almost any existing base. In particular, the work bowl 20 with the integrated slice thickness adjustment mechanism may be utilized as an accessory or aftermarket item with almost any base/motor, even bases or motors that were not designed to allow for slice thickness adjustment. This is in contrast to existing appliances which typically integrate any slice thickness adjustment device within the base itself.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A food processor, comprising:
   a base;
   a motor disposed within said base;
   a drive shaft operatively connected to said motor and extending outwardly from said base, said drive shaft being rotatable upon actuation of said motor;
   a bowl removably coupled to said base; said bowl having a handle;
   a lid removably coupled to said bowl so as to define a processing chamber;
   a slicing assembly positioned within said processing chamber and driven by said motor, said slicing assembly being positionable in a plurality of slicing positions to produce sliced food items of varying thicknesses; and
   a slice thickness adjustment mechanism operable to move said slicing assembly between said plurality of slicing positions, said slice thickness adjustment mechanism including a cartridge mounted to said bowl, said cartridge including an actuator drivingly coupled to a drive screw;
   wherein rotation of said drive screw causes the slicing assembly to move between said plurality of slicing positions;
   wherein said actuator is in direct connection with said handle on the said bowl.

2. The food processor of claim 1, wherein:
   said cartridge is mounted to a bottom of said bowl.

3. The food processor of claim 1, wherein:
   said actuator is a rotatable dial; and
   wherein said rotatable dial is positioned below a handle of said bowl.

4. The food processor of claim 3, wherein:
   said dial is rotatable about a vertical axis parallel to said drive shaft of said motor.

5. The food processor of claim 1, wherein:
   said slicing assembly includes a slicing blade and a rotating disc;
   wherein rotation of said drive screw in a first direction causes upward movement of said rotating disc relative to said slicing blade, and rotation of said drive screw in a second direction causes downward movement of said rotating disc relative to said slicing blade.

6. The food processor of claim 5, further comprising:
   an adapter shaft having a lower end having a plurality of teeth matingly engaging a corresponding plurality of teeth formed on said drive screw, and an upper end secured to a hub of said rotating disc.

7. The food processor of claim 3, wherein:
said dial is drivingly coupled to said drive screw via a gear assembly, said gear assembly including at least one gear and a drive belt.

8. The food processor of claim 1, wherein:
said cartridge includes a sleeve having a plurality of internal threads;
said drive screw includes a plurality of external threads corresponding to said internal threads of said sleeve; and
said drive screw is received within said sleeve.

9. A bowl for a food processor, comprising:
a floor;
a plurality of sidewalls extending from said floor and defining a processing chamber;
a handle; and
a slice thickness adjustment cartridge mounted below said floor, said slice thickness adjustment cartridge including a rotatable dial beneath said handle and drivingly coupled to a drive screw; said rotatable dial is in direct connection with said handle;
wherein rotation of said dial causes said drive screw to selectively extend from and retract into said cartridge to move a slicing assembly between a plurality of slicing positions.

10. The bowl of claim 9, wherein:
said bowl is configured to receive said slicing assembly within said processing chamber, said slicing assembly being positionable in a plurality of slicing positions to produce sliced food items of varying thicknesses;
wherein said dial is operable to move said slicing assembly between said plurality of slicing positions.

11. The bowl of claim 10, wherein:
an upper end of said drive screw has a plurality of teeth configured to matingly engage a corresponding plurality of teeth of a lower end of an adapter shaft, said adapter shaft including an upper end configured to mate with a hub of a rotating disc of said slicing assembly.

12. A food processor, comprising:
a base;
a motor disposed within said base;
a drive shaft operatively connected to said motor and extending outwardly from said base, said drive shaft being rotatable upon actuation of said motor;
a bowl removably coupled to said base; said bowl having a handle;
a slicing assembly positioned within said bowl and driven by said motor, said slicing assembly being positionable in a plurality of slicing positions to produce sliced food items of varying thicknesses; and
a slice thickness adjustment mechanism operable to move said slicing assembly between said plurality of slicing positions,
wherein said slice thickness adjustment mechanism is connected to a knob in direct connection with said handle on the said bowl.

* * * * *